United States Patent [19]

Caracappa

[11] 4,352,194
[45] Sep. 28, 1982

[54] SYSTEM AND METHOD FOR FREQUENCY DISCRIMINATION

[75] Inventor: Michael G. Caracappa, Haddonfield, N.J.

[73] Assignee: RCA Corporation, New York, N.Y.

[21] Appl. No.: 172,214

[22] Filed: Jul. 25, 1980

[51] Int. Cl.³ .................................... H04L 27/14
[52] U.S. Cl. .................................. 375/89; 375/80; 329/112; 179/84 VF
[58] Field of Search ...................... 375/80, 88, 89; 179/84 VF; 340/171 R, 168 S; 364/604, 819; 333/29; 324/77 G, 77 H; 329/112

[56] References Cited

U.S. PATENT DOCUMENTS

| | | | |
|---|---|---|---|
| 3,600,680 | 8/1971 | Maniere | 375/88 |
| 3,636,270 | 1/1972 | McIntosh | 179/84 VF |
| 3,812,462 | 5/1974 | Crossland | 340/168 S |
| 3,882,283 | 5/1975 | Proudfoot | 179/84 VF |
| 3,934,097 | 1/1976 | Carbrey | 179/84 VF |
| 3,937,899 | 2/1976 | Denenberg | 179/84 VF |
| 3,953,674 | 4/1976 | Fletcher | 340/147 SY |
| 3,962,645 | 6/1976 | Stewart | 455/35 |
| 3,973,242 | 8/1976 | Field | 371/69 |
| 3,983,379 | 9/1976 | Scott | 235/152 |
| 4,021,620 | 5/1977 | Jones | 179/84 VF |
| 4,037,151 | 7/1977 | Takeuchi | 324/77 G |
| 4,044,206 | 8/1977 | Champan | 179/84 VF |
| 4,045,620 | 8/1977 | Westbrook | 179/84 VF |
| 4,064,488 | 12/1977 | Chapmam | 340/171 R |
| 4,100,378 | 7/1978 | Claasen | 179/84 VF |
| 4,161,033 | 7/1979 | Martinson | 364/604 |
| 4,173,003 | 10/1979 | Thies | 328/55 |

Primary Examiner—Benedict V. Safourek
Assistant Examiner—Stephen Chin
Attorney, Agent, or Firm—Samuel Cohen; Joseph S. Tripoli; Donald W. Pillion

[57] ABSTRACT

A system for determining the frequency of any received tone segment of N possible time synchronous tone segments each having a period $T_1$ and each having one of N predetermined frequencies. The system comprises a first shift register having M stages, a second register also having M stages each being aligned with one of the M stages of the first shift register, sampling logic for samping each received tone segment into P samples where P is less than M and P≡M≡L, and logic for serially entering the P samples into the first shift register. Also provided is a time generator for generating 2N I and Q sampled reference tones each having P samples and representing one of the N predetermined frequencies, and for successively entering the 2N sampled reference tones into the second register at a rate $M/WT_1$ in positions in the second register successively displaced by W stages thereof so that each sampled reference tone is then successively aligned with the sampled received tone segment whose frequency is being determined, where 2NW is ≡L. Comparing logic is provided for comparing the quantized input tone segment with each quantized reference tone to determine the reference tone that most closely correlates with the input tone segment.

12 Claims, 6 Drawing Figures

SYSTEM AND METHOD FOR FREQUENCY DISCRIMINATION

The U.S. Government has rights in this invention under Contract No. DAAB07-78-C-2976 awarded by the Department of the Army.

This invention relates generally to systems and methods for determining the frequency of a received signal and more particularly, to a system wherein the frequency of the received signal is compared, at a high comparison rate, with the frequency of each of a number of reference signals each having a different frequency.

There are many schemes in the present art to detect the frequency of an incoming signal. Some of such systems involve phase lock loops which, in a sensitive coherent receiver, may have an acquisition range of about 100 Hz. Thus, in order to search a 30 KHz uncertainty range, 300 or more separate tests may have to be made. If 100 milliseconds are allowed for each attempted phase lock, the frequency search can take as long as 30 seconds. Other forms of frequency determination include spectrum analysis for a parallel search of a number of frequency reference signals, or a bank of filters, which may be real or which can be synthesized by means of the fast Fourier transform (FFT) algorithm. A large number of filters is expensive and the FFT requires a considerable amount of hardware and/or software with the execution time being appreciable if a large number of multiplications are required. The foregoing systems are either quite complex and expensive, require relatively long execution times, or have both disadvantages.

In one form of communication requiring frequency identification, a plurality of tones are modulated in sequence onto a carrier with each tone representing a Teletype character, for example. The tones are transmitted in time synchronous segments with each segment being known as a "symbol," i.e., a single tone existing for a given interval of time and representing one Teletype character. In order to decode such tone at a receiver, it is necessary to first determine the time of beginning of each symbol and then to identify the frequency thereof.

A prior art means for determining the frequency of a received tone or symbol comprises means for sampling the received signal P times, after the carrier has been removed, and to supply these P samples to an input shift register which can be a charge coupled device (CCD) or, alternatively, means for digitizing the samples into binary words which are then supplied to a suitable digital shift register. Both the CCD type shift register and the digital shift register have a length of P stages which is equal to the number of samples or bits representing the symbol. Both the analog or digitized samples are defined herein as "samples" resulting from sampling the received signal. After the P samples representing one symbol have been entered into the input register, N digitized (sampled) reference tones or signals (where N can be 64) are passed through a reference signal register at a very rapid rate relative to the sampling rate of the received signal. For example, if the input register contains 256 samplings, representing one symbol, then the 64 digitized reference tones, representing the 54 input tones, can all be clocked into the reference register in a time period equal to only a few sample clock pulses, as for example 16 sample clock pulses. Consequently the $64^{th}$ reference tone will be displaced in phase from the input signal by 16 samples. However, for many applications such phase displacement is not sufficient to cause serious degradation of the correlative comparison of the reference signal and the sampled input signal.

Appropriate timing means controls the time of comparison of each of the 64 reference signals with the input signal stored in the input register. The particular reference signal providing the largest correlation pulse upon comparison with the input signal identifies the frequency of the symbol stored in the input register.

One disadvantage of the foregoing prior art is that the reference signals must be clocked into the reference register at a very high rate compared with the sampling rate of the received input signal. In addition, the shifting of a portion of the given symbol out of the input register during the time that it is being compared with the reference tones does result in some degradation of the system which, for some applications, will make its use marginal.

The present invention provides a system whereby each of the stored reference tones is compared in phase with the entire received input symbol and at a slower rate than required heretofor.

In accordance with a preferred form of the invention there is provided, in a system employing N time synchronous tone segments each having a period $T_1$ and each having one of N predetermined frequencies, a means for determining the frequency of each tone segment and comprising first shift register means having M stages, second register means also having M stages each being aligned with one of the M stages of said first shift register means, and means for sampling each received tone segment into P samples, where P is less than M so that $M-P=L$, and means for serially entering said P samples into said first shift register means at the sampling rate $P/T_1$. Also provided are means for generating N sampled reference tones each having P samples and representing one of said N predetermined frequencies, and for successively entering said N sampled reference tones into said second register means at a rate $P/WT_1$ in positions in said second register means successively displaced by W stages thereof so that each sampled reference tone then becomes successively in alignment with the sampled received tone segment whose frequency is being determined, where N is an integer and WN is $\leq L$. Logic means are provided for comparing the sampled input tone segment with each sampled reference tone to determine the sampled reference tone that most closely correlates with the sampled input tone segment.

For purposes of describing the invention it will be assumed that the received signal consists of a carrier signal modulated in sequence by the 64 tones (symbols), each of a different frequency. The tones are time synchronous in that they are of equal time intervals and are received at the receiver continuously and in what would appear to be a random order. As mentioned above, each of the 64 tones can represent one character of a Teletype typewriter. The receiver must be able to detect the frequency of each tone to determine the character being received.

It will further be assumed that the 64 received tones extend from 300 Hz to 2662.5 Hz, spaced apart 37.5 Hz, and modulated upon a carrier of 30 MHz. Such incoming signal is assumed to be received at signal source 100 of FIG. 1. After elimination of the 30 MHz carrier at source 100, the incoming tone signal is sampled in sampler 101 at a 9600 sample per second rate. The sampling signal is generated within timing and control logic means 102 and supplied to sampler 101 via lead 103. Each of the symbols has a time duration such that sampling by the 9600 Hz sampling clock will result in 256 samplings. Such samplings are entered and stored on a continuous basis into input register 108 which can be a charge-coupled device (CCD) which stores such samplings as analog signals. While in the form of the invention being described the CCD register 108 is designated to have 512 stages, it will be apparent from the following description that either less than 512 or more than 512 stages can be employed for satisfactory results although requiring some changes to accommodate different timing.

Figure 1:
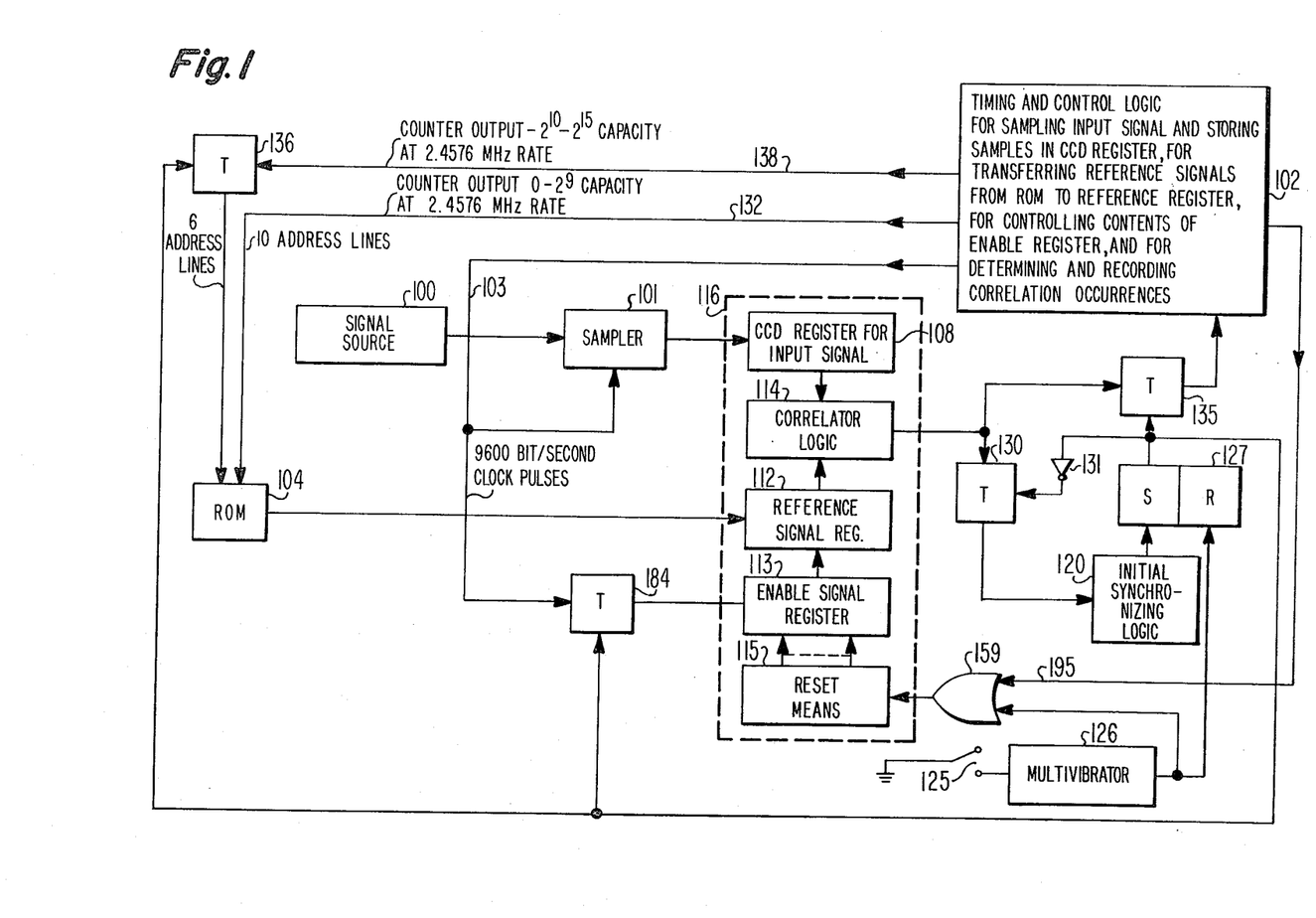
FIG. 1 is a combination block and logic diagram of a simplified form of the invention.

With register 108 containing 512 stages, the samplings of one symbol will occupy one half of register 108 or 256 stages. Thus a given symbol will be completely contained in register 108 for 256 sampling pulses. In other words, after a symbol consisting of 256 samplings is completely contained in the first 256 stages of register 108 it will require 257 additional sampling pulses to move the right-most sampling of such symbol out of the right-hand end of register 108. Thus there is sample time for 64 in-phase and 64 quadrature (I and Q) reference tones to each be compared with the entire 256 samplings for each received symbol.

Each of the 64 I and 64 Q reference tones consists of 256 bits, each bit being either a binary 1 or a binary 0, and which are coded in such a manner that each tone will correlate with one of the 64 input tones. Such reference tones are stored in a ROM 104, preferably in serial manner. More specifically, ROM 104 can consist of 128×512 (for I and Q signals) words with each word being one bit wide. Consequently, each reference tone is represented by 512 one-bit words, accessed in a serial manner. The reason each tone is represented by 512 one-bit words rather than 256 one-bit words is that each reference tone, which consists of only 256 bits, is located at various positions in the 512 one-bit words.

More specifically, as will be discussed in detail later herein, each 256-bit reference signal is positioned at different points in the 512-bit word since as each successive reference tone is compared with the 256 samples in input register 108 such 256 samples will gradually shift to the right in register 108 as new samples of the input signal are received. Thus, while the first reference tone will be compared with the 256 samples when such samples occupy the 256 left-most bit stages of register 108, the 64$^{th}$ reference tone will be compared with the 256 samples when such samples occupy the 256 right-most stages of CCD register 108.

It should be noted that while only 64 reference tones are to be compared with the received symbol samples, each of such reference tones is represented by an in-phase (I) portion and a quadrature phase (Q) portion so that, in fact, 128 reference signals must be compared with the 256 symbol samples. Consequently, since 256 samples in register 108 can move 256 stages to the right therein before moving out of register 108, it is apparent that the time available for each of the 128 reference signals to be entered into the reference signal register 112 for comparison with the 256 samples of the received symbol is equal to two sample periods of the 9600 bit per second sample rate. Thus, each successive one of the 128 reference signals must be positioned two stages to the right in reference signal register 112 relative to the position of the immediately preceding reference signal.

Further, the system provides an enable signal which is stored in 512 stage enable register 113. Such enabling signal consists of a group of 256 consecutive binary 1's with all of the remaining bits being binary 0's. The group of 256 binary 1's is caused to track the 256-bit reference signal contained in reference register 112 and also the position of the 256 sample input signal stored in register 108. The function of the enable signal in register 113 is to permit correlation only between the contents of the stages of registers 108 and 112 which are aligned with one of the stages of enable register 113 containing a binary 1. All of the remaining stages of registers 108 and 112 which correspond to stages in enable signal register 113 containing a binary 0 provide no output when compared with each other in comparator logic 114.

It should be noted that input register 108, comparator logic 114, reference signal register 112, enable register 113, and a reset means which will be described later herein together form a correlator contained within dotted block 116.

Figure 2:
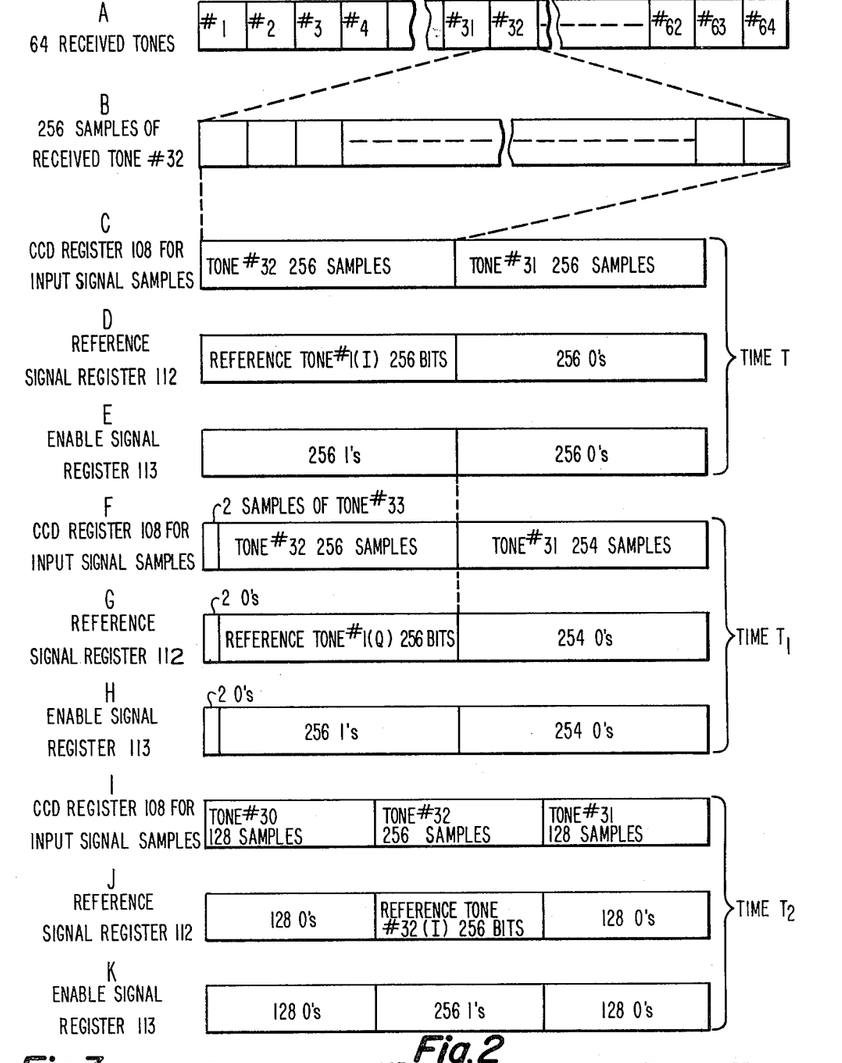
FIG. 2 is a functional type diagram showing the timing relationship between input signals stored in the input register, reference tones entered into the reference register, and the state of the enabling register which controls the stages of the input register and the reference register to be compared.

For a better understanding of the foregoing, reference is made to FIG. 2 which shows, among other things, the contents of the CCD register 108 of FIG. 1, reference signal register 112, and enable signal register 113 under various stages of operation.

FIG. 2 shows horizontal bars A through K which represent different things. For purposes of discussion herein the bars A through K of FIG. 2 will be identified as bar, bar waveform, or register 2A, 2B . . . 2K, rather than employing identification such as bar waveform A of FIG. 2.

In FIG. 2 the bar waveform 2A represents, in consecutive order, the 64 possible received tones which are shown in consecutive order in bar waveform 2A although they are in fact received in random order as described hereinbefore. Bar waveform 2B represents the 256 samples of a particular received tone symbol arbitrarily selected as tone 32. The bars 2C through 2K represent the contents of various registers shown in FIG. 1, such as input register 108, reference register 112, and enable register 113. More specifically, bars 2C, 2F and 2I represent the contents of CCD register 108 of FIG. 1 at three instants in time. Bars 2D, 2G, and 2J represent the contents of reference signal register 112 of FIG. 1 and bars 2E, 2H, and 2K represent the contents of enable register 113 at the same three instants in time. The three bars 2C, 2D, and 2E represent the contents of registers 108, 112, 113, respectively, at time $t_0$ when the 256 samples of received tone #32 occupy the 256 left-most stages of CCD register 108. The 256 bits of the I portion of reference tone #1 occupy the 256 left-most bit positions of reference signal register 112, and the 256 binary 1's of enable signal register 113 occupy the 256 left-most bit positions of enable register 113. For purposes of illustration it has been assumed that received tone #31 occupies the right-most 256 stages of the CCD register 108 of FIG. 1 although any other tone could occupy such right-most 256 stages.

A comparison of the I portion of reference tone #1 with received tone #32 in correlator 113 of FIG. 1 produces no significant correlation signal. Two sample times later, at time $t_1$, the conditions shown in bars 2F, 2G, and 2H exist. Received tone #32 has advanced two stages to the right as shown in bar 2F and 2 samples of received tone #33 have entered CCD register 108 at the left end thereof. The Q portion of reference tone #1 has been entered into reference signal register 112 as shown in bar 2G. It is to be understood that the I and Q portions of reference tone #1 are contained in separate 512-bit words. Thus the 512 bits shown present in reference signal register 112 (bar 2G) are a different 512 bits from those entered in reference signal register 112 as shown in bar 2D. In the word locations of ROM 104 of FIG. 1, the 512 bits in the reference register 112, as shown in bar 2G, immediately follow the 512 bits in reference register 112 as shown in bar 2D.

However, the 256 binary 1's shown in bar 2H are the same 256 binary 1's shown in bar 2E, although moved two stages to the right in bar 2H to accommodate the new positions of the 256 samples at the input signal and the reference tone as shown in bars 2F and 2G relative to their positions as shown in bars 2C and 2D. Thus, the 256-bit Q portion of the reference signal is preceded by two binary 0's as shown in bar 2G and followed by 254 0's. The enable signal of bar 2H also is preceded by 2 0's and followed by 254 0's. The Q portion of reference tone #1 of bar 2G again does not correlate with received tone #32 stored in the CCD register as shown in bar 2F.

It should be noted that no correlation can occur between the contents of the CCD register 108 (bar 2F) and the 254 0's in the right-most portion of bar 2G since such correlation is prohibited by the 254 0's in the right-most portion of enable signal register 113, as shown in bar 2H. The logic for such prohibiting of the correlation by 0's in enable signal register 113 will be discussed later herein.

At the end of the clocking of the I portion of reference tone #32 into reference signal register 113 as shown in bar 2J the 256 samples of tone #32 will have advanced to the right in CCD register 108 of FIG. 1, as shown in bar 2I. It can be seen that the 256 bits of the I reference tone #32 of bar 2J is positioned in the total 512-bit reference signal words in such a manner as to be aligned with the stages of the CCD register 108 containing the 256 samples of received tone #32 at time $t_2$.

Further the enable signal contained in enable signal register 113 and shown in bar 2K has also been advanced to the right in the enable signal register so that it remains aligned with both reference tone #32 as shown in bar 2J and the 256 tone samples of received tone #32 as shown in bar 2I. Thus, correlation will occur between the reference tone #32 of bar 2J and the 256 samples of received tone #32 contained in CCD register 108 as shown in bar 2I.

The foregoing discussion describes in general terms the basic concept and operation of the invention during stable operation. However, before such stable operation can be obtained the system must acquire initial synchronization between the received symbols and the clocking of the reference tones into reference signal register 112. Following such initial synchronization additional logic is required to maintain synchronization and also to clock reference signals into the reference signal register 112, and to supply symbol samples into CCD register 108, and to advance the enable signal in the enable signal register 113 in the proper time relationship.

Figure 3:
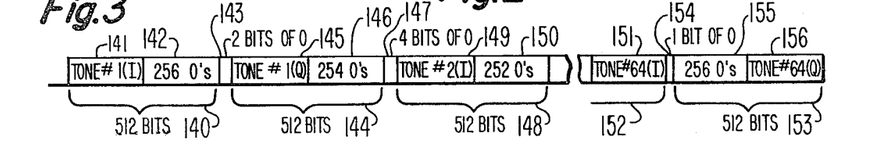
FIG. 3 is a diagram showing the relationship between successive reference tones as they are stored in memory.

Referring now to FIG. 3 there is shown generally how the reference tones are stored in the ROM 104 of FIG. 1. In FIG. 3 the I portion 141 of tone #1 is shown as being in the left-most 256 bits of 512-bit digitized word 140. The right-most 256 bits 142 of the 512-bit word 140 contain 256 0's.

The Q portion of tone #1 is shown as being shifted two stages to the right in the 512-bit word 144 with respect to the I portion 141 of tone #1. Thus, two 0's, designated by reference character 143, precede the Q portion 145 of tone #1 so that Q portion will be aligned with the received tone segment after it has shifted two sampling periods to the right in CCD input register 108 of FIG. 1. Accordingly, portion 146 of 512-bit digitized word 144 will contain only 254 0's.

The I portion 149 of tone #2 is preceded by four binary 0's as indicated by reference character 147 since the input tone segment will have shifted two more sample periods to the right in CCD register 108, and will be followed by 252 0's in portion 150 of the 512-bit word 148 stored in memory 104.

The portion 151 of tone #64 of word 152 will be followed by two binary 0's, as indicated by reference character 154, since the input tone has shifted almost completely to the right of CCD input register 108 at this time. Then when the Q portion 156 of tone #64 is entered into the reference register 112 of FIG. 1, it will occupy the extreme right-most 256 bit positions of said reference signal register 112.

Generally, to begin operation of the system, the detection and synchronization logic 120 of FIG. 1 is first initialized. When the synchronizing preamble signal is detected in the received signal, symbol synchronization is estimated from the time of occurrence of the correlation peak and the logic for steady-state operation 102 takes control of the operation from that point onward. Such start-up operation will now be explained in greater detail. An operator closes switch 125 which causes multivibrator 126 to generate a pulse. Such pulse resets the flip-flop 127 and also enables reset means 115 through OR gate 159 so that enable register 113 is set to a start condition where is has 256 binary 1's in the 256 left-most stages thereof and 256 binary 0's in the 256 right-most stage thereof. Thereafter enable register 113 is set to said start condition via lead 195 at the beginning of the comparison of the 128 reference signals, with each newly received symbol by logic to be described re FIG. 4.

The reset condition of flip-flop 127 disables TRANSMISSION gate 184 and prevents the 9600 bit per second clock pulse signal on lead 103 from changing the reset state of enable register 113. TRANSMISSION gate 130 is enabled through INVERTER 131 due to the reset condition of flip-flop 127. Thus, the output of correlator logic 114 will be supplied to the initial synchronizing logic 120 via the enabled TRANSMISSION gate 130. As will be discussed later herein a 9600 bit per second clock pulse signal exists on output lead 103 from timing and control logic 102 at all times so that sampler 101 will continue to sample the tones being received from signal source 100. Such samplings are entered into CCD register 108.

Assume that tone #1 has been selected to be the synchronizing preamble signal at the head of a message. The selected reference signal is therefore tone #1 which occupies, as discussed above, the first 1024 words of ROM 104. The least significant 10 bits of a counter contained in timing and control logic 102 of FIG. 1 continuously counts from 0 to 1023 at a rate 2.4576 MHz rate on address lines 132 which address the first 1024 words in ROM 104. These 1024 words are clocked into reference signal register 112.

Thus the reference signal register 112 will alternately contain the I, and then the Q portions of tone #1 which occupy positions in reference signal register 112 as shown respectively in bars 2D and 2G of FIG. 2. The enable signal remains stationary in the enable register as shown in bar 2E. Even though the enable signal in enable signal register 113 will be out of alignment with the Q portion of the reference tone #1 as shown in bar 2G there will be sufficient correlation with the remaining 254 aligned stages to provide a very accurate correlation pulse at nearly maximum amplitude. Thus, by means contained in the initial synchronizing logic 120 to be described in detail later herein, correlation between reference tone #1 and a received tone will be detected when a tone #1 is in fact received.

The correlation pulse resulting from such correlation will be supplied through enable TRANSMISSION gate 130 to the initial synchronizing logic 120 which will respond thereto to set flip-flop 127. The setting of flip-flop 127 disables TRANSMISSION gate 130 through INVERTER 131 and enables TRANSMISSION gate 135 so that the output of correlator logic 114 will now be supplied to timing and control logic 102. The timing and control logic 102 will respond to the output from correlator 114 to control and time the stable operation of the circuit in a manner to be described in detail later herein.

The setting of flip-flop 127 further functions to enable TRANSMISSION gate 136 thereby adding to the count capacity of the counter which is supplied to ROM 104. More specifically the two sets of address lines 132 and 138 now comprise the total output of the effective counter so that the entire 65,436 words of ROM 104 can now be accessed successively and the 128 reference tones can therefore be clocked successively into the reference register 112.

Figure 4:
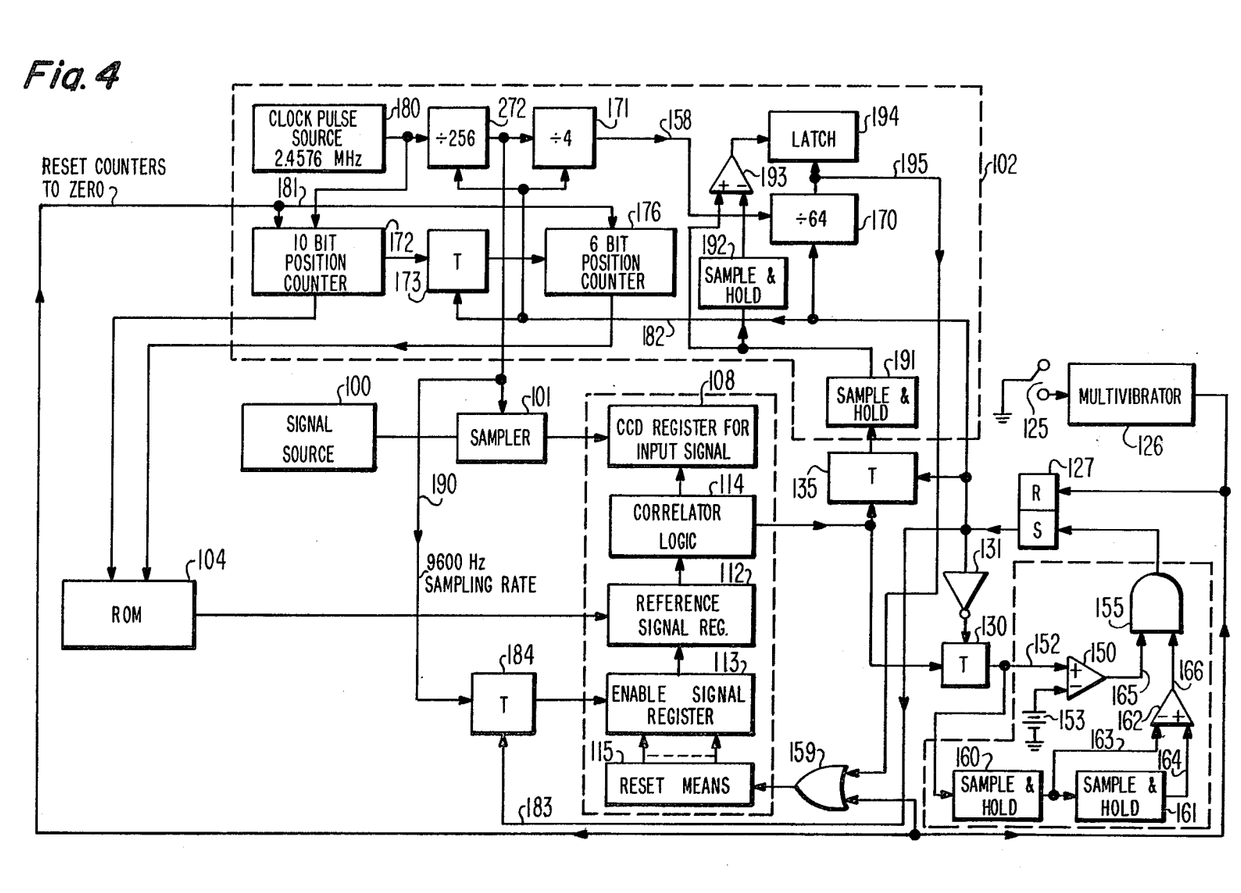
FIG. 4 is a more detailed block and logic diagram of the structure shown in FIG. 1.

Referring now to FIG. 4 there is shown the details of the initial synchronizing logic 120 of FIG. 1 and also the timing and control logic 102. Elements of FIG. 4 which correspond to elements of FIG. 1 are identified by the same reference characters. Thus, dotted blocks 120 and 102 of FIG. 4 and the logic therewithin correspond to the blocks 120 and 102 of FIG. 1. Other corresponding elements are similarly identified.

In order to obtain initialization two conditions must be met which are represented by high level signals on the two inputs 165 and 166 of AND gate 155. Generally, these two conditions are as follows. First, the output signal of correlation logic 114 must rise above a certain theshold voltage represented by battery 153 in order to inform the logic of block 120 that a correlation peak is being approached. When the input signal on input 152 of difference amplifier 150 exceeds the value of the threshold voltage reference 153 the said difference amplifier 150 will output a positive signal to input 165 of AND gate 155.

Secondly, the time of occurrence of peak correlation output must be determined. Such peak occurrence of correlation output voltage is determined by detecting the point at which the peak has been reached and just immediately passed so that the correlation output voltage has just begun to decline.

Such peak occurrence is detected by means of two sample and hold circuits 160 and 161 and difference amplifier 162. As long as successive samplings of the output of correlator logic 114 continuously increase the signal obtained in sample and hold circuit 160 will be greater than the signal contained in sample and hold circuit 161 since the value supplied to sample and hold circuit 160 from the prior sampling subsequently is contained in the sample and hold circuit 161. However, the first time the signal supplied to sample and hold circuit 160 is less than the previous sample then the contents of sample and hold circuit 160 will exceed that of sample and hold circuit 161 and the signal supplied to the positive input 164 of difference amplifier 162 will exceed the signal supplied to the negative input 163 thereof. Difference amplifier 162 will then supply a high level signal to input 166 of AND gate 155. Therefore since both inputs 165 and 166 of AND gate 155 have a high level signal thereon, the output thereof will be a high level signal to set flip-flop 127.

As discussed above the setting of flip-flop 127 will disable TRANSMISSION gate 130 through INVERTER 131 and will enable TRANSMISSION gate 135 to permit subsequent outputs from correlator logic 114 to be supplied to the timing and control logic within dotted block 102.

The setting of flip-flop 127 will also set divide-by-64 divider 170, divide-by-4 divider 171, and divide-by-256 divider 272 to 0 and will also enable TRANSMISSION gates 173 and 184. The enabling of TRANSMISSION gate 173 in effect increases the count capacity of the counters supplied to the ROM 104 by adding the 6 stages of counter 176 to the 10 stages of counter 172 which access only the first 1024 word positions of ROM 104 during the initial synchronization phase of the operation.

It should be noted that the closing of start switch 125 and the output of multivibrator 126 upon the closing of start switch 125 cause both the 10-bit position counter 172 and the 6-bit position counter 176 to be initially set to 0.

During the initial synchronization period the output of clock pulse source 180 is supplied only to the 10-bit position counter 172 through lead 181. Since TRANSMISSION gate 173 is disabled during the initial synchronization period the 6 stage counter 176 remains at its 0 count since no carry bit is permitted to flow from counter 172 to counter 176.

Upon acquisition of initial synchronization and the setting of flip-flop 127, however, TRANSMISSION gate 173 is enabled through leads 182 to combine counters 172 and 176 into a single 16-bit counter to enable access of the entire 65,536 memory locations of ROM 104 in a successive manner.

Thus, as each new symbol is entered into CCD register 108 from signal source 100 and sampler 101 the 128 reference signals are successively entered into reference signal register 112 and follow the symbol in CCD register 108 as it advances to the right in said register 108 as sampling continues.

The 9600 Hz sampling rate appearing on lead 190 is, in addition to being supplied to sampler 101, also supplied to TRANSMISSION gate 184 which was enabled by the setting of flip-flop 127 via lead 183. Thus, the 256 binary 1's in enable register 113 will be advanced to the right at the same rate as the 256 samples in register 108.

When the 128$^{th}$ reference signal, which will be a Q signal, has been entered into reference signal register 112 and compared with the 256 samples in CCD register 108, the comparison of the 128 reference tones with the received symbol will have been completed and the process will begin anew with the next received symbol, which now occupies the 256 left-most stages of CCD register 108. It is necessary at this time to also reposition the string of 256 binary 1's in the enable signal register 113 with the 256 right-most stages thereof containing binary 0's. Such resetting of enable signal register 113 is accomplished by energizing reset means 115 with pulse supplied thereto from the output of divider 170 through OR gate 159. The reason that a 0 count in divider 170 will energize reset means 115 at the proper time will be discussed below. For the time being it will suffice to state that divider 170 counts the reference tones being supplied to reference signal register 112 and upon resetting to 0 indicates that all 128 tones have been compared with the particular symbol contained in CCD register 108.

After the initial synchronization has been obtained by means of the logic within block 120, flip-flop 127 will become set as described hereinbefore and will initially reset divider 170 to a count of 0. Divider 170 is driven by 2400 Hz clock 158 which is derived from the 9600 Hz sampling clock 190 through divide-by-four circuit 171. It will be recalled that the symbol stored in CCD register 108 is advanced at the 9600 Hz sampling rate through CCD register 108 and further that the I and Q portions of each of the 64 reference signals are entered into and through reference signal register 112 every two sampling pulses. Since each reference tone comprises an I and a Q portion two sampling pulse periods are required to enter each tone into the reference signal register 112. Thus, it is necessary to divide the 9600 Hz sampling rate at the output of divider 272 by 4 in order to produce a clock signal on lead 158 which will identify the completion of each comparison of a reference tone with the received input symbol. Since counter 170 is a divide-by-64 counter it in fact will count and identify the 64 tones being compared as they are entered into reference signal register 112 and compared with the input signal in CCD register 108.

It is also necessary to identify the specific one of the 64 tones which produces correlation with the symbol being analyzed. Such determination is accomplished as follows. The output of correlator 114 is supplied through enabled TRANSMISSION gate 135 to a first sample and hold circuit 191, the output of which is supplied to a second sample and hold circuit 192. The output of the first sample and hold circuit 191 is also supplied to the positive input of difference amplifier 193 and the output of the second sample and hold circuit 192 is supplied to the minus input of said difference amplifier 193. Thus, the sample and hold circuit 192 will always retain the correlation pulse occurring immediately prior to the correlation pulse stored in sample and hold circuit 191.

The output of difference amplifier 193 will be a low level signal when the contents of sample and hold logic 191 is less than the contents of sample and hold logic 192. However, each time the contents of sample and hold logic 191 exceeds that of sample and hold logic 192 difference amplifier 193 will supply a high level signal to latch 194 which will respond thereto to store the particular count contained, at that time, in divider 170. It is apparent that the reference tone producing the largest correlation pulse will ultimately be stored in latch 194 after all 64 tones have been compared with the given symbol.

It is to be understood that proper timing is required to energize the sample and hold circuits 191 and 192 as well as the sample and hold circuits 160 and 161 discussed before. Such timing circuits will be discussed subsequently in connection with FIG. 5. At the present time it is sufficient to state that the correlation pulses for each reference tone are sampled at the time that each I signal and each Q signal of each reference tone is compared with the received symbol in register 108. Such samplings are first combined and then, at the time of comparison of the Q signal of each reference tone, are sampled by sample and hold logic 191. At the next sampling the prior sampling in sample and hold logic 191 is transferred to sample and hold logic 192.

As mentioned briefly above, the number of stages M, in each of input register 108, reference signal register 112 and enable signal register 113 must be greater by L stages than the number of samples P which comprise the input signal, the reference signal and the enable signal, respectively, so that the N reference tones can be compared with each sampled input tone during the time that said input tone segment is being shifted, in its entirety, along the input register. Let the input register, the reference register, and the enable register each have M stages therein and the input signal, the reference signal and the enable signal each be comprised of P samples. Then $L = M - P$.

If the time between samples of the input tone is $T_1$ then $LT_1$ is the total time available to perform the 2N correlations. Thus, once the entire received tone occupies the left-most portion of the received signal register, the correlations are performed at the minimum rate $2N/LT_1$. The minimum rate for shifting the reference signal into the reference signal register is $M \times 2N/LT_1$ since M samples have to be shifted into the reference signal register before a correlation can be performed. Thus, if we let $R_2$ be the shift rate at which the reference signal register is loaded, then $R_2 \geq 2MN/LT_1$.

The foregoing can also be expressed as follows. Let W be the number of stages in the reference register means by which each successive reference tone must be displaced to remain aligned with the sampled received tone segment whose frequency is being determined and where $2NW \leq L$. Then a correlation is performed every $WT_1$ seconds. In terms of W we have the relationship $R_2 \geq M/WT_1$.

Figures 5, 5A:
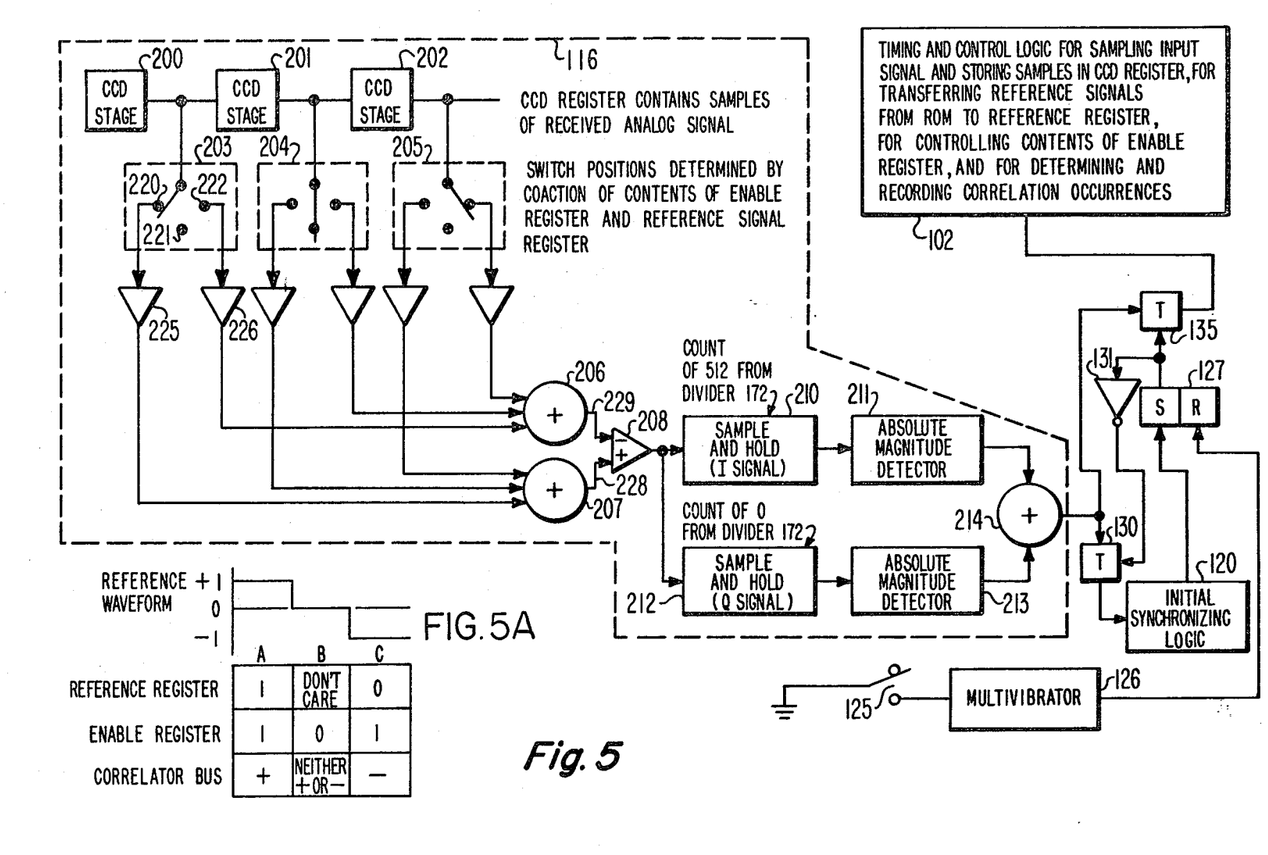
FIG. 5 is a block and logic diagram showing the basic concept of the correlation portion of the system.

Referring now to FIG. 5 there is shown in expanded form the correlator logic corresponding to correlator logic 116 of FIG. 4 and its general relationship to the initial synchronization logic 120 and the timing control logic 102 of FIG. 4. Further, in FIG. 5 TRANSMISSION gates 130 and 135, INVERTER 131, and flipflop 127 correspond to similar elements designated by the same reference character in FIGS. 1 and 4. Also, the logic within the dotted block 116 of FIG. 5 corresponds to the correlator 116 of FIGS. 1 and 4.

Within dotted block 116 there are shown three stages 200, 201, and 202 of CCD register 108 (FIG. 4), the outputs of which are supplied respectively to switches 203, 204, and 205. Each of the switches 203, 204, and 205 are identical so that only one will be discussed, e.g. switch 203. Switch 203 consists of three contacts 220, 221, and 222 to which armature 223 can be individually and selectively connected.

The switches 203, 204, and 205 respond to the contents of corresponding stages of the reference register 112 and the enable register 113 of FIG. 4 to route the output of the corresponding stage of the CCD register 108 to either the summing logic 206 or 207 through appropriate buffer amplifier such as buffer amplifiers 225 and 226. While switches 203, 204, and 205 are shown as electromagnetic devices it is to be understood that they can be electronic in construction.

Consider now switch 203 for example. The electronic logic represented by switch 203, shown in FIG. 6 and to be discussed later, is such that when the contents of a particular stage of the reference register 112 and the corresponding stage of the enable register 113 are both binary 1's, the contact 223 of switch 203 will make with contact 220. Thus, the output of CCD stage 200 will be routed through buffer amplifier 225 to summer 207 whose output is connected to the positive input of difference amplifier 208 through correlator bus 228. The foregoing relationship is shown in column A of the truth table of FIG. 5A.

Should the contents of a particular stage of the reference register 112 be a 0 and the contents of the corresponding stage of the enable register be a 1, then switch 203 will respond thereto so that armature 223 will make with contact 222 and route the contents of CCD stage 200 through buffer amplifier 226 to summer 206 and then to the negative correlator summing bus 229. The foregoing is shown in column C of the truth table of FIG. 5A.

If the contents of a particular stage of the enable register 113 of FIG. 4 is a 0, then armature 223 will make contact with 221 so that the contents of correlator state 200 is routed neither to summer 206 nor to summer 207 but in fact is blocked from affecting the system. The foregoing relationship is shown in column B of the truth table of FIG. 5A.

It should be noted that the output of difference amplifier 208 is the sum of the absolute magnitudes of the two signals supplied thereto on correlator bus bars 229 and 228. Assuming that a good correlation exists, the samplings supplied to summer 206 and then to the negative bus bar 229 should all be negative signals corresponding to the binary 0's of the reference tone contained in the reference signal. Such negative signals are inverted by difference amplifier 208 since they are supplied to the negative input thereof. Thus, they appear as positive voltages on the output of difference amplifier 208 and are added to the positive signals supplied to the positive input of difference amplifier 208 via correlator bus 228.

It will be recalled that each of the 128 I and Q reference signals which are compared with the stored 256 samples of the input signal symbol are 512 bits long. Each I and Q reference tone is fully loaded into reference signal register 112 of FIG. 4 at the counts of 512 and 0, respectively, of 10-bit counter 172. The 10-bit counter 172 coupled with the 6-bit counter 176 will continue to count upwardly and through the 65,536 words stored in ROM 104 of FIG. 4. The two states, 512 and 0, of 10-bit counter 172 (FIG. 4) generate sample commands to sample and hold circuits 210 and 212, respectively, of FIG. 5. Sample and hold circuits 210 and 212 record the outputs of difference amplifier 208 respectively upon the comparison of the I and Q reference components of each tone.

Absolute magnitude detectors 211 and 213 convert the output signals of sample and hold circuits 210 and 212 to positive values and supply such absolute magnitude values to summer 214. The output of summer 214 is supplied to initial synchronizing logic 120 and timing and control logic 102 as discussed hereinbefore.

Figure 6:
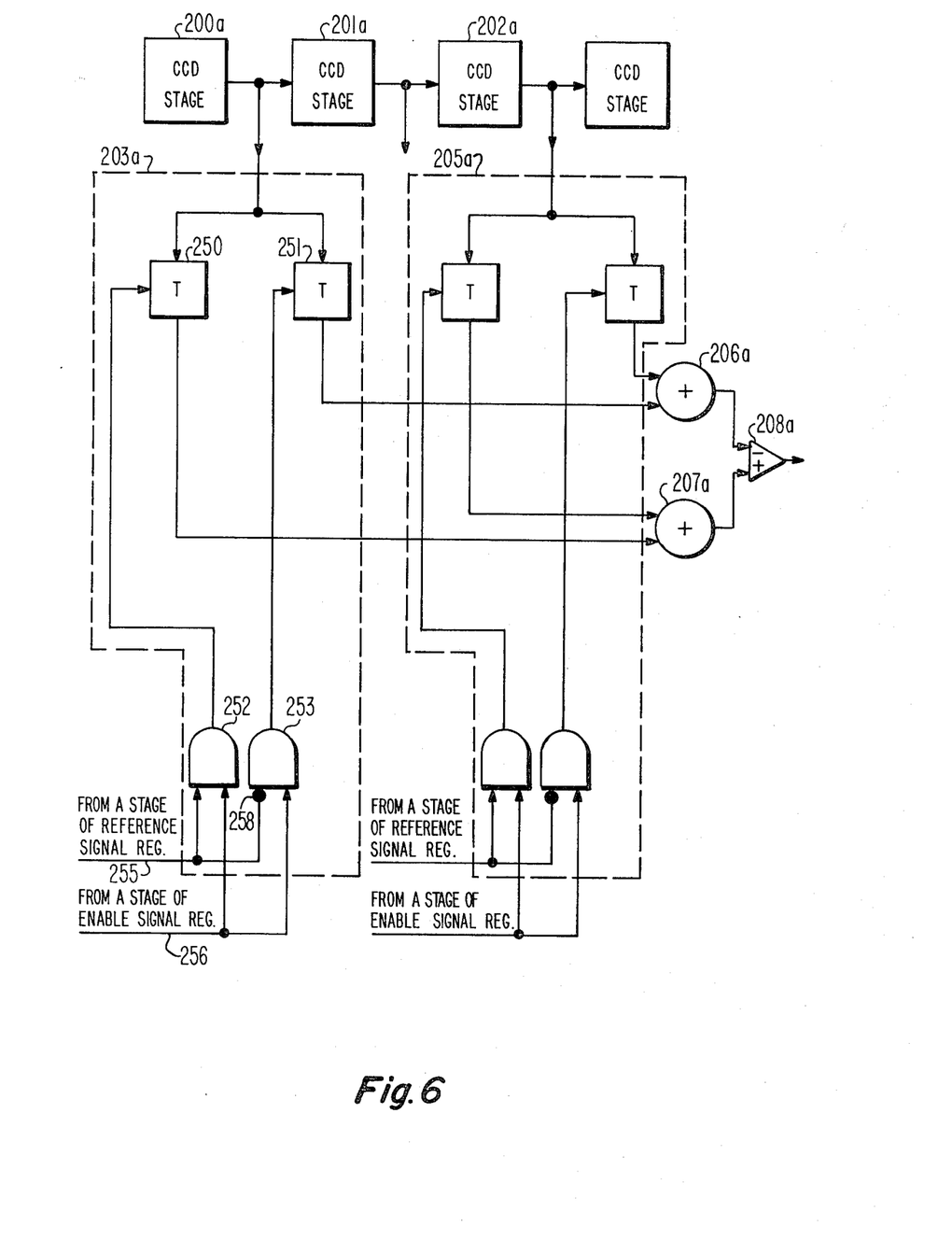
FIG. 6 is another form of the correlation portion of the system.

Referring now to FIG. 6 there is shown a form of the correlator 116 of FIGS. 1 and 4 employing logic elements rather than the mechanical switches 203–205 of FIG. 5. Elements of FIG. 6 which correspond functionally to elements of FIG. 5 are identified by the same reference characters followed by the letter A. Thus the block 203A of FIG. 6 corresponds to switch 203 of FIG. 5.

Consider now the logic within the dotted block 203A. When a given stage X of reference register 112 contains a binary 1 and the corresponding stage of enable register 113 also contains a binary 1, then AND gate 252 is enabled to supply a binary 1 to TRANSMISSION gate 250, thereby enabling TRANSMISSION gate 250 to pass the output of the CCD stage 200A therethrough and to summer 207A, the output of which is supplied to the positive input of difference amplifier 208A.

AND gate 253, however, is disabled because of the inhibit input 258 thereof which inverts the binary 1 from the reference register 112 (FIG. 4) to a 0. Thus, TRANSMISSION gate 251 is disabled to prevent the output of stage 200A of CCD register 108 from being supplied to summer 206A.

If enable register 112 (FIG. 4) contains a binary 0 then both AND gates 252 and 253 (FIG. 6) are disabled so that both TRANSMISSION gates 250 and 251 are also disabled, thus preventing any output signal from being supplied to either summer 206A or 207A. The output of difference amplifier 208A is identical to the output of the difference amplifier 208 of FIG. 5.

What is claimed is:

1. In a system employing N time synchronous tone segments which are sampled at a sampling rate $1/T_1$ and each having one of N predetermined frequencies, means for determining the frequency of each tone segment and comprising:

first shift register means having M stages;

second register means having at least M stages each being aligned with one of the M stages of said first shift register means;

means for sampling each received tone segment into P samples where $P<M$ and $M-P=L$, and for entering said P samples into said first shift register means;

means for generating 2N(I and Q) reference tones each being P bits in length and each having one of said N predetermined frequencies;

means for successively entering the P bits of said 2N(I and Q) reference tones into said second register means at a rate $R_2 \geq 2MN/LT_1$ in successively displaced positions in said second register means so that each reference tone is aligned with the sampled received tone segment whose frequency is being determined; and logic means for comparing the sampled tone segment with each reference tone to determine which reference tone correlates most closely with said sampled tone segment.

2. A system as in claim 1 and further comprising:
second shift register means having at least M stages each aligned with a corresponding one of the M stages of said first shift register means;
means for generating an enabling signal having P consecutive bits of a given value; and
means for maintaining said P consecutive bits of said enabling signal in alignment with said P bits of said reference tone being compared with said sampled tone segment whose frequency is being determined;
said logic means responsive to said P consecutive bits of said enabling signal to compare only the contents of those stages of said first shift register means and said second register means which are aligned with the stages of said second shift register means containing said P consecutive bits of said enabling signal.

3. A system as in claim 1 and further comprising means for initially synchronizing a given reference tone with a predetermined sampled tone segment having the same frequency as said predetermined sampled tone segment when said predetermined sampled tone segment has assumed a predetermined position in said first shift register means.

4. A system as in claim 1 in which said samples are bits and further comprising:
memory means for storing said N reference tones with the P bits of each reference tone being embedded in a larger, stored digitized word P+L bits in length and further with each successive reference tone, in the order in which it is to be supplied to said second register means, being embedded in said digitized word W bit positions farther from the beginning of said digitized word than the immediately prior reference tone; and
control means for accessing said memory to successively supply said digitized words containing said reference tones to said second register means at a rate $(P+L)/WT_1$, where $2NW \leq L$.

5. In a system employing N time synchronous tone segments which are sampled at a sampling rate $1/T_1$ and each having one of N predetermined frequencies, means for determining the frequency of each tone segment and comprising:
first shift register means having M stages;
second register means having at least M stages each being aligned with one of the M stages of said first shift register means;
means for sampling each received tone segment into P samples where $P<M$ and $M-P=L$, and for serially entering said P samples into said first shift register means;
means for generating N sampled reference tones each having P samples and each representing one of said N predetermined frequencies;
means for successively entering said N sample reference tones into said second register means at a rate $M/WT_1$ in positions in said second register means successively displaced by W stages thereof so that each sampled reference tone becomes successively in alignment with the sampled received tone segment whose frequency is being determined, where W is an integer and $2NW \leq L$;
logic means for comparing the sampled tone segment with each sampled reference tone to determine the sampled reference tone most closely correlated with said sampled tone segment.

6. A system as in claim 5 and further comprising:
third shift register means having at least M stages each aligned with a corresponding one of the M stages of said first shift register means;
means for generating a sampled enabling signal having P consecutive samples of a given value; and
means for maintaining said P consecutive samples in alignment with said P samples of said reference tone being compared with said sampled tone segment whose frequency is being determined;
said logic means responsive to said P consecutive samples to compare only the contents of those stages of said first shift register means and said second register means which are aligned with the stages of said third shift register means containing said P consecutive samples of said sampled enabling signal.

7. A system as in claim 5 and further comprising means for initially synchronizing a given sampled reference tone with a received sampled input tone segment having the same frequency as said given sampled reference tone when said received sampled input tone has assumed a predetermined position in said first shift register means.

8. A system as in claim 5 which said samples are bits and further comprising:
memory means for storing said N reference tones with the P bits of each reference tone being embedded in a larger, stored digitized word $M=P+L$ bits in length and further with each successive reference tone, in the order in which it is to be supplied to said second register means, being embedded in said digitized word W bit positions farther from the beginning of said digitized word than the immediately prior reference tone; and
control means for accessing said memory to successively supply said digitized words containing said reference tones to said second shift register means at a rate $M/WT_1$, where $2NW \leq L$.

9. In a system employing N time synchronous encoded signals each having a period $T_1$ and each comprising one of N predetermined codes, means for identifying each received encoded signal and comprising:
first shift register means having M stages;
second register means having at least M stages each being aligned with one of the M stages of said first shift register means;
means for quantizing each received encoded signal into P samples where $P<M$ and $M-P=L$, and for entering said P samples into said first shift register means;
means for generating N quantized reference signals each comprising one of said N predetermined codes;
means for successively entering said N quantized reference signals into said second register means at a rate R in successively displaced positions in said second register means so that each quantized reference signal is aligned with the quantized received signal whose identity is being determined, where $N/R \leq L/M \, T_1$; and
logic means for comparing the quantized received encoded signal with each quantized reference signal to determine which quantized reference signal correlates most closely with said quantized received encoded signal.

10. A system as in claim 9 and further comprising:
third shift register means having at least M stages each aligned with a corresponding one of the M stages of said first shift register means;
means for generating a quantized enabling signal having P consecutive samples of a given value;
means for maintaining said P consecutive samples in alignment with said P samples of said reference signal being compared with said quantized received encoded signal whose identity is being determined; and
said logic means responsive to said P consecutive samples to compare only the contents of those stages of said first and second shift register means which are aligned with the stages of said third shift register means containing said P consecutive samples of said enabling signal.

11. A system as in claim 9 and further comprising means for initially synchronizing a given quantized reference signal with a received quantized encoded signal having the same encoding as said given quantized reference signal when said quantized received encoded signal has assumed a predetermined position in said first shift register means.

12. A system as in claim 9 in which said samples are bits and further comprising:
memory means for storing said N reference signals with the P bits of each reference signal being embedded in a larger, stored digitized word P+L bits in length and further with each successive reference signal, in the order in which it is to be supplied to said second register means, being embedded in said digitized word W bit positions farther from the beginning of said digitized word than the immediately prior reference signal; and
control means for accessing said memory to successively supply said digitized words containing said reference signals to said second register means at said rate R, and where $WN \leq L$.

* * * * *

UNITED STATES PATENT AND TRADEMARK OFFICE
CERTIFICATE OF CORRECTION

PATENT NO. : 4,352,194

DATED : September 28, 1982

INVENTOR(S): Michael Gerald Carcappa

It is certified that error appears in the above-identified patent and that said Letters Patent is hereby corrected as shown below:

In the Abstract, line 9, "PËM̈L," should be --P-M=L,--;
line 11, "time" should be --tone--;
line 20, "2NW is ∎L." should be --2NW is $\widetilde{<}$ L.--;
Column 10, line 64, "flipflop" should be --flip-flop--.

Signed and Sealed this

First Day of February 1983

[SEAL]

Attest:

GERALD J. MOSSINGHOFF

Attesting Officer     Commissioner of Patents and Trademarks